A. H. LIGHTHALL.

Improvement in Furniture-Casters.

No. 133,650. Patented Dec. 3, 1872.

UNITED STATES PATENT OFFICE.

ALMER H. LIGHTHALL, OF ALBANY, NEW YORK.

IMPROVEMENT IN FURNITURE-CASTERS.

Specification forming part of Letters Patent No. 133,650, dated December 3, 1872.

*To all whom it may concern:*

Be it known that I, ALMER H. LIGHTHALL, of Albany, in the county of Albany and State of New York, have invented a certain Improvement in Furniture-Casters, of which the following is a specification:

This invention relates to that class of furniture-casters which are composed of a spherical roller or ball turning in a socket and bearing against smaller anti-friction balls therein, allowing the caster to turn in every direction with equal facility and the least amount of friction. My improvement consists in certain novelties of construction which will be generally set forth in the ensuing description and specifically pointed out in the claim.

Figure 1:
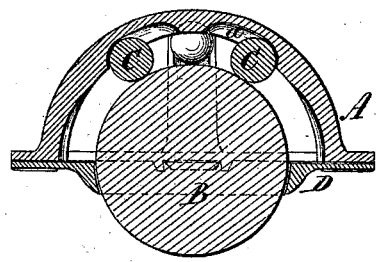
Figure 2:
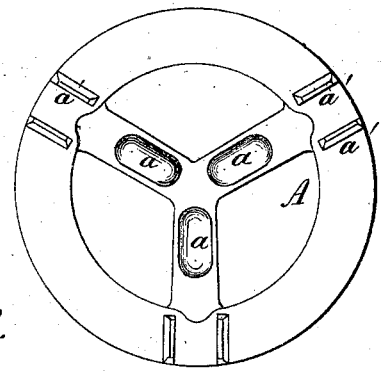
Figure 3:
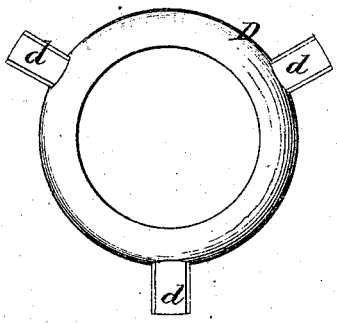
Figure 4:

Figure 1 is an angular vertical section. Fig. 2 is a bottom view of the socket. Fig. 3 is a plan view of the bottom plate or ring which retains the roller in its socket. Fig. 4 is an elevation, showing the manner of connecting the bottom plate or ring to the socket.

The same letters of reference are employed in all the figures in the designation of identical parts.

The socket A is formed with an annular horizontal ring, from which rise three bars converging and meeting near the apex, they being suitably curved so as to form a semi-circular cavity for the reception of the upper portion of the spherical roller B. In each of the said bars of the sockets is formed an elongated semi-circular groove, $a$, which is entered by an anti-friction ball, C, which, protruding a little, constitutes a bearing-surface for the roller B. The bottoms of the grooves $a$ are concentric with the surface of the spherical roller, and therefore permit the anti-friction balls C to roll up and down in them and avoid the danger of wedging them in their seats by the entrance of small particles of matter upon the sides of the balls. The roller B is retained in the socket A by the ring D, which fits over it, and is fastened to the annular ring of the socket by means of three (more or less) projecting lugs, $d$, on the ring D, entering short projections $a'$ $a'$ on the bottom of the socket. The latter being made of malleable iron permits the projections $a'$ $a'$ to be bent down over the lugs $d$ of the bottom plate or ring D, forming a very simple and effective connection.

What I claim as my invention, and desire to secure by Letters Patent, is—

The herein-described furniture-caster, composed of the roller B, which bears against anti-friction balls C C C arranged in elongated grooves $a$ $a$ $a$ in the skeleton socket A of malleable iron, and which is retained in the socket by the ring D fastened to the socket by lugs $d$ and projections $a$ bent down over them all, substantially in the manner and for the purpose specified.

In testimony whereof I have signed my name hereto this 26th day of December, A. D. 1871, in the presence of two attesting witnesses.

ALMER H. LIGHTHALL.

Witnesses:
CLINTON J. WALKER,
FRIEDERICH W. SCHENMEYER.